United States Patent
Marchand et al.

(10) Patent No.: US 9,957,452 B2
(45) Date of Patent: May 1, 2018

(54) METHOD AND DEVICE FOR TREATING A SYNTHESIS GAS FROM A BIOMASS GASIFICATION STEP

(71) Applicant: GDF SUEZ, Courbevoie (FR)

(72) Inventors: Bernard Marchand, Paris (FR); Yilmaz Kara, Eaubonne (FR); Frédéric Legrand, Paris (FR)

(73) Assignee: GDF Suez, Courbevoie (FR)

( * ) Notice: Subject to any disclaimer, the term of this patent is extended or adjusted under 35 U.S.C. 154(b) by 85 days.

(21) Appl. No.: 15/300,271

(22) PCT Filed: Apr. 14, 2015

(86) PCT No.: PCT/EP2015/058108
§ 371 (c)(1),
(2) Date: Sep. 28, 2016

(87) PCT Pub. No.: WO2015/158737
PCT Pub. Date: Oct. 22, 2015

(65) Prior Publication Data
US 2017/0145327 A1    May 25, 2017

(30) Foreign Application Priority Data

Apr. 14, 2014 (FR) ...................... 14 53328

(51) Int. Cl.
*B01D 53/04* (2006.01)
*C10K 1/04* (2006.01)
(Continued)

(52) U.S. Cl.
CPC ............ *C10K 1/04* (2013.01); *B01D 53/0438* (2013.01); *B01D 53/0462* (2013.01); *B01D 53/265* (2013.01); *C10K 1/26* (2013.01); *C10K 1/32* (2013.01); *B01D 2253/102* (2013.01); *B01D 2253/108* (2013.01); *B01D 2253/202* (2013.01);
(Continued)

(58) Field of Classification Search
CPC ............ B01D 53/0438; B01D 53/0462; B01D 53/265; B01D 2253/102; B01D 2253/108; B01D 2253/202; B01D 2256/345; B01D 2257/70; B01D 2257/80;
(Continued)

(56) References Cited

U.S. PATENT DOCUMENTS

| 4,696,680 A | 9/1987 | Ghate et al. |
| 5,152,976 A | 10/1992 | Fong et al. |

(Continued)

FOREIGN PATENT DOCUMENTS

| DE | 882 541 C | 7/1953 |
| EP | 0 444 684 A2 | 9/1991 |

(Continued)

*Primary Examiner* — Frank Lawrence
(74) *Attorney, Agent, or Firm* — PatShegen IP

(57) ABSTRACT

A method for treating a synthesis gas from a gasification step. The synthesis gas is cooled to condense heavy organic impurities and water. At the end of the cooling step, light organic impurities and inorganic impurities are adsorped by at least one adsorption bed. The water and heavy tars are separated by decantation from the step of cooling the synthesis gas. At least one adsorption bed is regenerated by temperature-modulated or pressure-modulated desorption.

17 Claims, 2 Drawing Sheets

(51) Int. Cl.
*C10K 1/32* (2006.01)
*B01D 53/26* (2006.01)
*C10K 1/26* (2006.01)

(52) U.S. Cl.
CPC .... *B01D 2256/245* (2013.01); *B01D 2257/70* (2013.01); *B01D 2257/80* (2013.01); *B01D 2259/4009* (2013.01); *B01D 2259/40083* (2013.01)

(58) Field of Classification Search
CPC .. B01D 2259/40083; B01D 2259/4009; C10K 1/04; C10K 1/26; C10K 1/32
USPC ........ 95/92, 93, 115, 141, 143; 96/108, 121, 96/126, 144
See application file for complete search history.

(56) References Cited

U.S. PATENT DOCUMENTS

| | | | | |
|---|---|---|---|---|
| 5,451,249 | A * | 9/1995 | Spiegel | B01D 53/75 95/117 |
| 6,610,124 | B1 * | 8/2003 | Dolan | B01D 53/02 95/105 |
| 9,427,693 | B1 * | 8/2016 | Hill | B01D 53/0423 |
| 2010/0111824 | A1 | 5/2010 | Schlichting et al. | |

FOREIGN PATENT DOCUMENTS

| | | |
|---|---|---|
| EP | 0 583 981 A2 | 2/1994 |
| EP | 2445998 | 5/2012 |
| FR | 1 360 112 A | 4/1964 |

* cited by examiner

METHOD AND DEVICE FOR TREATING A SYNTHESIS GAS FROM A BIOMASS GASIFICATION STEP

RELATED APPLICATIONS

This application is a § 371 application from PCT/EP2015/058108 filed Apr. 14, 2015, which claims priority from French Patent Application No. 14 53328 filed Apr. 14, 2014, each of which is incorporated herein by reference in its entirety.

TECHNICAL FIELD OF THE INVENTION

The present invention relates to a method and device for treating a synthesis gas from a gasification step. It applies, in particular, to the gasification of hydrocarbon combustibles for producing biomethane.

STATE OF THE ART

So-called second-generation biomethane production is based on lignocellulosic biomass gasification and the catalytic methanation of the synthesis gas, or "syngas" thus produced.

Between the biomass gasification step and the catalytic methanation step, the synthesis gas must be purified in order to:
- optimize the efficiency of the methanation step; and
- avoid a rapid deactivation of the catalyst required for the conversion performed during the methanation.

On output from the gasification step, the synthesis gas comprises:
- organic impurities, for example types of tars, and gasification residues; and
- inorganic pollutants such as hydrogen sulfide, carbon oxysulfide, ammonia or hydrochloric acid, for example.

The inorganic pollutants and gasification residues can lead to the clogging or abrasion of the ducts in which these impurities and residues are circulated. In addition, these impurities and residues can cause the deactivation of a methanation catalyst, traditionally constructed based on nickel, on which the methanation reaction takes place.

The inorganic pollutants can irreversibly deactivate a methanation catalyst, or accelerate the corrosion of the equipment that these pollutants are in contact with.

The current systems for eliminating or reducing organic or inorganic pollutants of the synthesis gas are divided into two categories. So-called "primary" systems aim to reduce the amount of tar produced by adjusting the geometry, operating conditions, or the catalysts and additives of the reactor responsible for the biomass conversion. So-called "secondary" systems refer to all the units installed downstream of the reactor responsible for biomass gasification, and utilize standard separation methods. These standard methods can comprise, for example, wet scrubbing, dry scrubbing or treating the gas at high temperature. The primary systems do not, currently, make it possible to avoid using supplemental secondary systems.

The person skilled in the art knows, in particular, of installations known as "Gussing" plants, named after the town where a reference gasification device was installed. These installations comprise secondary purification means positioned at the output from the gasification reactor. These means therefore comprise:

- a device for cooling the synthesis gas enabling the latent heat of the synthesis gas to be recovered for use in an urban heat network;
- a particle filter enabling the solid particles present in the synthesis gas to be trapped; and
- a device for scrubbing the gas (known as a "scrubber") with biodiesel to separate the impurities from the synthesis gas.

This device is not currently satisfactory since the impurities rapidly saturate the biodiesel.

In either case, the synthesis gas is purified at the expense of the installation's overall efficiency.

A device and method for purifying synthesis gas is also known from patent EP2445998. According to this document, the method used comprises four steps:
- a step of cooling the synthesis gas;
- a step of scrubbing the synthesis gas with an oil;
- a step of regenerating the oil; and
- a step of treating the scrubbed gas with a catalytic adsorbent.

The cooling step makes it possible, in particular, to separate the heaviest compounds from the synthesis gas, and also to bring the synthesis gas down to an optimum temperature for scrubbing. The step of scrubbing the synthesis gas with an oil enables organic compounds from the gas flow to be adsorbed. The step of treating the scrubbed gas with a catalytic adsorbent makes it possible to adsorb the lightest residual tars and the inorganic compounds.

However, the adsorption used during the scrubbing step comprises a certain number of limitations, especially since the solvent used must meet a certain number of complex characteristics such as, for example, having a strong affinity with the compounds to be eliminated, low viscosity, high vapor pressure. In addition, the dimensions of the absorber used during the adsorption are difficult to estimate because of a lack of knowledge about the thermodynamic liquid-vapor equilibrium data of the organic compound/water/solvent systems used. Lastly, the regeneration of the oil used during the scrubbing step generates effluents to be treated, and therefore requires a dirty water treatment unit. This method requires an oil absorber, whose oil is regenerated, and a catalytic adsorber. The amount of waste produced therefore remains substantial, and the regeneration of the oils is therefore performed at the expense of the installation's overall efficiency.

For all these reasons, current systems do not make it possible to optimize the efficiency of the conversion of carbon into synthesis gas, nor to minimize the waste from the unit producing the synthesis gas.

OBJECT AND SUMMARY OF THE INVENTION

The present invention aims to remedy all or part of these drawbacks.

To this end, the present invention envisages, according to a first aspect, a method for treating a synthesis gas coming from a gasification step, which comprises:
- a step of cooling the synthesis gas in order to condense heavy organic impurities and water;
- a step of adsorption, on exiting the cooling step, of light organic impurities and inorganic impurities by at least one adsorption bed;
- a step of separation, by decantation, of the water and heavy tars from the step of cooling the synthesis gas; and a step of regeneration of at least one adsorption bed by temperature-modulated or pressure-modulated desorption.

Performing the adsorption step directly on exiting the cooling step removes the need for scrubbing with a solvent and regenerating the solvent. These provisions make it possible to reduce the installation and operating costs of a synthesis gas production unit. In addition, these provisions make it possible to reduce the device's environmental impact and to limit its energy consumption. In addition, the presence of several adsorption beds makes it possible to ensure the continuity of the treatment thanks to a simplified automatic routine for using different beds.

In addition, the energy consumption is reduced. This is because the oils from the adsorption are difficult and costly to regenerate since the techniques known as "stripping" or distillation require large amounts of energy linked to these techniques' need for vaporization. In the case of adsorption, the links are weaker between the mediums of the adsorption bed and the impurities.

In some embodiments, the synthesis gas is cooled to between 5° C. and 30° C. during the cooling step.

In some embodiments, the synthesis gas is cooled to between 5° C. and 10° C.

These temperatures make it possible to reach the dew point temperature of the heavy tars and water.

In some embodiments, the method that is the subject of the present invention comprises a step of cooling the decantation water, from the separation step, to between 5° C. and 30° C., the cooled decantation water being used for the step of cooling the synthesis gas.

These embodiments make it possible to limit the method's consumption of water.

In some embodiments, during the water cooling step, the decantation water from the separation step is cooled to between 5° C. and 10° C.

These temperatures make it possible to reach the dew point temperature of the heavy tars and water.

In some embodiments, the regeneration step is performed by injecting a hot fluid against each said adsorption bed.

In some embodiments, the hot fluid is superheated vapor at a temperature of 110° C. to 250° C., and with a superheated vapor volumetric flow rate 3 to 5 times less than a synthesis gas volumetric flow rate.

In some embodiments, the hot fluid is a pure gas or a gas mixture chosen from $CO_2$, $CH_4$, $H_2$, $CO$, at a temperature of 110° C. to 250° C. and with a gas volumetric flow rate 3 to 5 times less than a synthesis gas volumetric flow rate.

In this way, the regeneration is carried out in a time less than or equal to the saturation time of the adsorption bed.

In some embodiments, a portion of the products from the regeneration step is used in the step of separation by decantation.

In some embodiments, the regeneration step is carried out at the same time, at least partially, as the adsorption step.

These embodiments have the advantage of allowing the method's efficiency to be optimized. Preferably, the method uses at least two beds alternating an adsorption step and a regeneration step.

In some embodiments, the regeneration step comprises a step of desorbing the adsorption bed.

These embodiments have the advantage of allowing efficient regeneration of the adsorption bed. In addition, these embodiments have the advantage of increasing the method's efficiency.

In some embodiments, the regeneration step comprises a step of cooling an adsorption bed, which is carried out at the same time, at least partially, as the adsorption step, and at the same time, at least partially, as the step of desorbing an adsorption bed.

The advantage of these embodiments is that they enable the method's efficiency to be optimized. In addition, in some preferred embodiments, the method utilizes three adsorption beds carrying out in turn a sequence of adsorption, regeneration and cooling steps such that at any one time a single bed is carrying out one of these steps.

In some embodiments, the device that is the subject of the present invention comprises a step of switching between a first adsorption bed carrying out the adsorption step and at least one second adsorption bed carrying out a regeneration step.

The advantage of these embodiments is that they enable continuity in the adsorption applied to a synthesis gas, while enabling optimum adsorption of the impurities in the gas.

In some embodiments, the step of regenerating an adsorption bed comprises a step of decanting tars collected during the cooling step.

These embodiments have the advantage of allowing better use of the tars collected. These embodiments have the advantage of making it possible to separate the condensed water and collected tars, the volume of effluents containing tars is also reduced in this way. In addition, this embodiment allows BTX to be recycled.

In some embodiments, the regeneration of the adsorption bed is carried out by injecting an inert gas into the adsorption bed.

According to a second aspect, the present invention envisages a device for treating a synthesis gas from a gasification means, which comprises:
- a cooler for the synthesis gas, to condense heavy organic impurities and water;
- at least one means for adsorption, on output from the cooler, of light organic impurities and inorganic impurities, comprising at least one adsorption bed connected to the output from the cooler;
- a separator, comprising a means for decanting the water and heavy tars output from the cooler, from the synthesis gas; and
- a means for regenerating at least one adsorption bed by temperature-modulated or pressure-modulated desorption.

As the particular features, advantages and aims of the device are identical to those of the method that is the subject of the present invention, they are not repeated here.

In some embodiments, the device that is the subject of the present invention comprises at least two adsorption beds and a means for switching between the adsorption beds, configured to allow the synthesis gas to circulate in at least one of the adsorption beds when every other adsorption bed is in the desorption phase.

The advantage of these embodiments is that they make it possible to increase the device's efficiency.

In some embodiments, the cooler utilizes a liquid for scrubbing the synthesis gas.

These embodiments enable the synthesis gas to be scrubbed as well as cooled.

In some embodiments, the scrubbing liquid is water or oil.

The advantage of these embodiments is that they make it possible to increase the device's efficiency.

BRIEF DESCRIPTION OF THE FIGURES

Other particular advantages, aims and features of the invention will become apparent from the non-limiting description that follows of at least one method and device for treating a synthesis gas from a gasification step that are the subjects of the present invention, with reference to drawings included in an appendix, wherein.

DETAILED DESCRIPTION OF THE EMBODIMENTS

The present description is given as a non-limiting example.

It is now noted that the figures are not to scale.

It is also now noted that the wording "a" or "an" in the following description means "at least one", and is only used for reasons of clarity. In addition, this wording can be replaced by "a plurality of".

Figure 1:
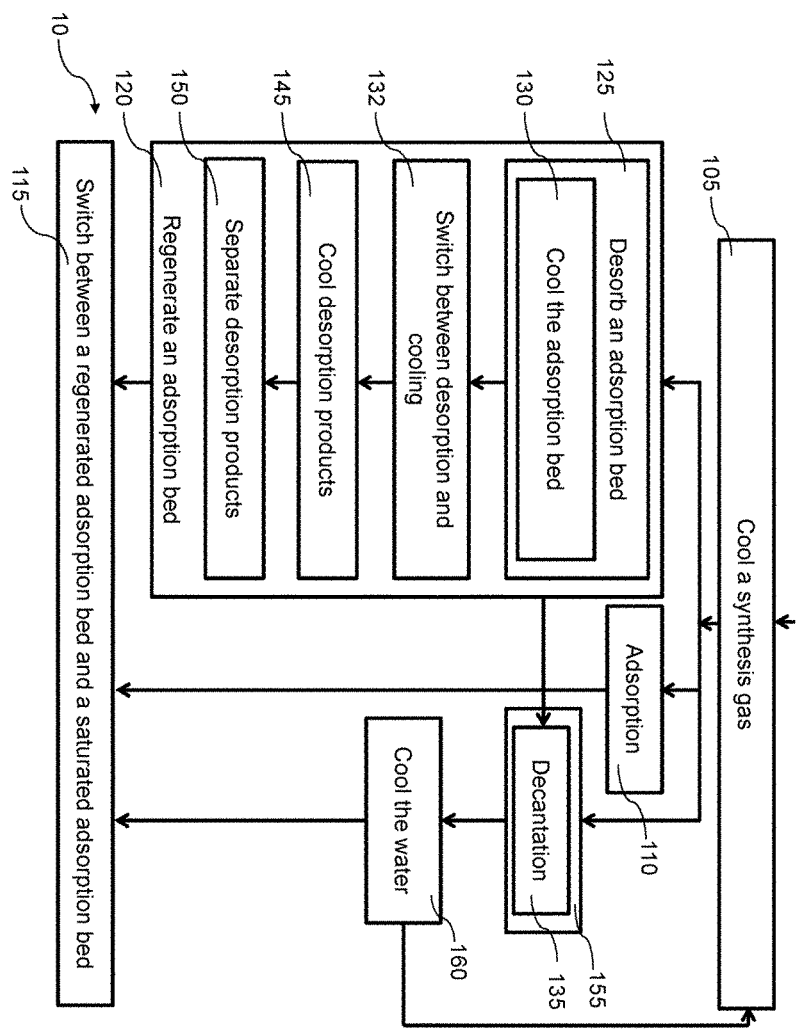
FIG. 1 represents, in the form of a logical diagram, steps in a particular embodiment of the method that is the subject of the present invention.

FIG. 1 shows a particular embodiment of the method 10 for treating a synthesis gas from a biomass gasification step that is the subject of the present invention. This method 10 comprises:
- a step 105 of cooling the synthesis gas;
- a step 110 of adsorption of the synthesis gas by an adsorption bed;
- a step 120 of regenerating an adsorption bed by temperature-modulated or pressure-modulated desorption, which can be carried out at the same time as the adsorption step 110, comprising:
  - a step 125 of desorbing an adsorption bed, comprising a step 130 of cooling the desorption products;
  - a step 140 of switching between a bed carrying out the desorption step 125 and a bed carrying out the cooling step 130;
  - a step 145 of cooling the products from the desorption step 125; and
  - a step 150 of separating the cooled products; and
- a step 115 of switching between a regenerated adsorption bed and a saturated adsorption bed; and
- a step 155 of separating, by decantation 135, the water and heavy tars from the synthesis gas cooling step 105.

The cooling step 105 is carried out, for example, by utilizing a condenser so allowing the separation of the tars transported by the synthesis gas flow. This condenser reduces the temperature of the synthesis gas at a given pressure so as to reach the dew point temperature of the heavy tars and water. This condenser is a direct gas-liquid contactor, for example a packed column, a Venturi scrubber, or a plate column. This condenser is also connected to a refrigeration means and to a is heat exchange means, for example a heat exchanger. In some variants, the synthesis gas cooled during the cooling step 105 is again input into the cooler, so as to increase the efficiency of this step 105.

Advantageously, the cooling step 105 is carried out by quenching the synthesis gas using cooled water. Quenching allows the water vapor and heavy tars present in the synthesis gas to be condensed. The residue from the quenching is then treated by decantation. The cooling is carried out at a temperature between 5° C. and 30° C., and preferably between 5 and 10° C. The operating pressure for the quenching is at a slight overpressure relative to the atmosphere and at a pressure close to the pressure of the gasification reactor that produces the synthesis gas.

The synthesis gas is cooled to between 5° C. and 30° C. during the cooling step 105. Preferably, the synthesis gas is cooled to between 5° C. and 10° C.

The products from the cooling step 105 are then separated by decantation. The water is preferably reused for the cooling step 105, after cooling, and the heavy tars are eliminated.

In some embodiments, the method 10 comprises a step 160 of cooling the decantation water, from the separation step 155, to between 5° C. and 30° C., the cooled decantation water being used for the step 105 of cooling the synthesis gas.

In some variants, during the water cooling step 160, the decantation water from the separation step 155 is cooled to between 5° C. and 10° C.

The adsorption step 110 is carried out, for example, by utilizing at least one adsorption bed, which comprises, for example, activated carbon, zeolites or adsorbent polymers. The temperature of this bed is chosen to enable high adsorption of the light tars and inorganic impurities transported by the synthesis gas on output from the cooling step 105. During this adsorption step 110, the synthesis gas on output from the cooling step 105 passes through the adsorption bed in order to collect tars and inorganic compounds transported by the synthesis gas. In particular, this embodiment of the method 10 that is the subject of the present invention comprises a plurality of adsorption steps 110 carried out, for example, by connecting adsorbent beds in series or in parallel. This plurality of adsorption steps 110 allows greater flexibility for the purification method 10. In some embodiments, the method 10 utilizes at least two adsorption beds. While one of these beds carries is out an adsorption on the synthesis gas, at least one other bed carries out the regeneration step 120. In some preferred embodiments, the method 10 utilizes three adsorption beds. While one of these beds carries out an adsorption on the synthesis gas, one other bed carries out the desorption step 125 and the third bed carries out the cooling step 130.

The step of regenerating an adsorption bed 120 is carried out, for example, by performing a step 125 of desorbing a saturated adsorption bed. This desorption step 125 is, for example, carried out, for organic compounds, by reducing the pressure and increasing the temperature to which the adsorption bed is exposed. Water vapor, heated for example to 140° C., is also introduced into a desorption means in which the desorption step 125 is carried out. PSA ("Pressure Swing Adsorption") and TSA ("Thermal Swing Adsorption") techniques can, for example, be employed to carry out the adsorption step 125.

In some variants, the regeneration step 120 is performed by injecting a hot fluid against each said adsorption bed. In some variants, the hot fluid is superheated vapor at a temperature of 110° C. to 250° C., and with a superheated vapor volumetric flow rate 3 to 5 times less than a synthesis gas volumetric flow rate.

In some variants, the hot fluid is a pure gas or a gas mixture chosen from $CO_2$, $CH_4$, $H_2$, CO, at a temperature of 110° C. to 250° C. and with a gas volumetric flow rate 3 to 5 times less than a synthesis gas volumetric flow rate.

The flow rate considered here is the flow rate of the synthesis gas to be treated by the method 10.

In some embodiments, a portion of the products from the regeneration step 120 is used for the decantation 135 of the synthesis gas.

In some embodiments, the regeneration 120 of the adsorption bed is carried out by injecting an inert gas into the adsorption bed.

The method 10 comprises a step 130 of cooling the bed on which the desorption step 125 was carried out. The desorption step 125 is carried out by injecting water vapor onto the adsorption bed. This injection leads to the bed's temperature rising above the bed's operating temperature in adsorbing the synthesis gas. The step of cooling 130 the bed, after the desorption step 125, is therefore necessary.

The cooling of the adsorption bed is carried out by injecting an inert gas to preserve the bed's physicochemical characteristics. For example, a $CO_2$ flow is injected into the bed, counter-current or co-current.

On output, the desorption step 125 produces water vapor and light tars. The water and light tars are then sent to a decantation tank to separate the water from the tars. After cooling, the water can then be reused to cool the synthesis gas. The light tars, including benzene, toluene and xylenes, are then injected into the decantation tray 135 of heavy organic impurities and water from the synthesis gas cooling. The addition of light tars enables a fluxing of the mixture and prevents the widespread formation of emulsion in the decantation trays.

In some embodiments, the method 10 utilizes a single adsorption bed. In these embodiments, the adsorption bed first carries out the adsorption step 110 then, when this bed is saturated, the input of synthesis gas into the bed is interrupted. The adsorption bed then carries out the regeneration step 120 comprising, in addition, the desorption step 125 then the cooling step 130. Once cooled, the input of synthesis gas is activated and the bed carries out a new adsorption step 110.

In other embodiments, the method 10 utilizes two adsorption beds. In these configurations, while one bed carries out the adsorption step 110, the other bed carries out the regeneration step 120.

In some preferred embodiments, the method 10 utilizes three or more adsorption beds. In these configurations, while one bed carries out the adsorption step 110, a second bed carries out the desorption step 125 of the regeneration step 120, and a third bed carries out the cooling step 130 of the regeneration step 120.

In some embodiments, the method 10 does not comprise a cooling step 130.

The switching step 140 is carried out, for example, by utilizing a switch configured to control the performing of the cooling step 130 for a bed on which the desorption step 125 has been performed.

The step of decanting tars 135 is carried out, for example, by utilizing a settlement tank. This decantation step 135 comprises a step of injecting a scrubbing or fluxing liquid, for example rapeseed methyl ester, HANs ("Heavy Aromatic Naphtha") or one of the light tars obtained by desorption of the adsorption beds. This scrubbing liquid speeds up the decantation of the tars. The decanted tars come from the cooling step 105. The heavy tars are accompanied by water also condensed during the cooling step 105.

The step of cooling 145 products from the desorption is carried out, for example, with water cooled to a temperature of less than 30° C., and more specifically, to a temperature below the dew point temperature of the heavy tars.

The step 150 of separating cooled desorption products is carried out, for example, by utilizing a separator or a settlement tank for the water and light tars.

The separation step 150 is advantageously followed by a step of using the water for the cooling step 105, and by a step of using light tars in the water/light tars settlement tank.

The switching step 115 is carried out, for example, by utilizing a switch, or a three-way valve, configured to supply an unsaturated adsorption bed with the synthesis gas output from the cooling step 105. When an adsorption bed is saturated, the switch closes a synthesis gas injection valve in this adsorption bed and opens a synthesis gas injection valve of another, unsaturated, adsorption bed. When an injection valve is closed in this way, a step of regenerating the adsorption bed 120 is started.

The switching step 115 allows the continuous treatment of the synthesis gas, while allowing every other saturated adsorption bed to be regenerated at the same time as the treatment of the gas. By extension, this switching step 115 makes it possible to multiply the parallel treatment circuits. For example, as described in FIG. 2, the method 10 can comprise three adsorption beds in parallel: one bed in the adsorption phase, and two beds in the regeneration phase.

In some embodiments comprising three beds, a sequence utilizing the method 10 can be, for example:
  supplying a synthesis gas to a first adsorption bed until the first bed is saturated;
  when the first bed is saturated, the synthesis gas input is directed towards a second adsorption bed, and a desorption step of a regeneration step is performed on the first bed;
  when the second bed is saturated, the synthesis gas input is directed towards a third adsorption bed, a cooling step is performed on the first bed, and a desorption step of a regeneration step is performed on the second bed;
  when the third bed is saturated, the synthesis gas input is directed towards the regenerated first bed, a cooling step is performed on the second bed, and a desorption step of a regeneration step is performed on the third bed.

Once this initialization phase has been completed, each bed reaching saturation is replaced by a regenerated bed.

Figure 2:
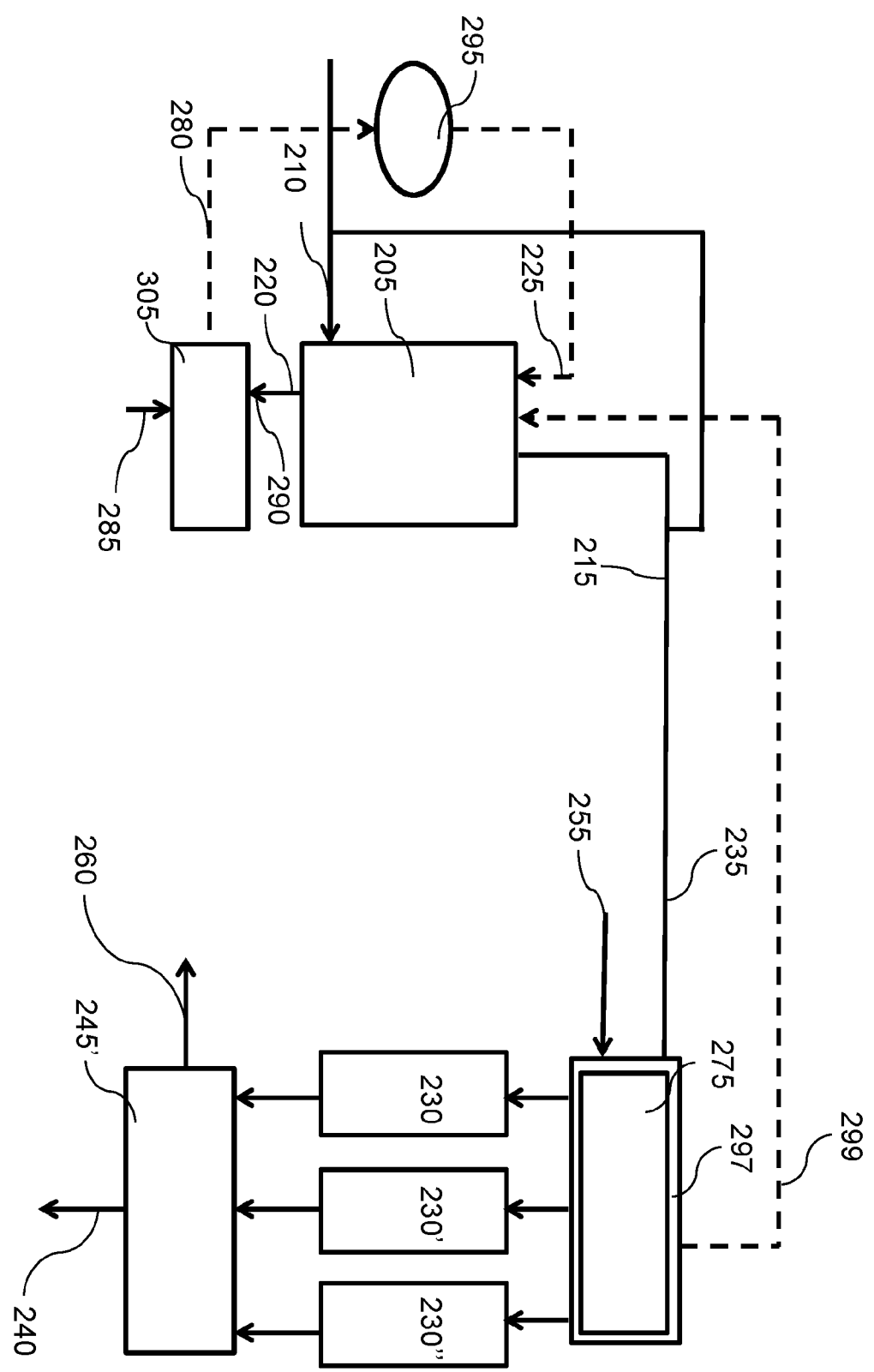
FIG. 2 represents, schematically, a particular embodiment of the device that is the subject of the present invention.

FIG. 2 shows a particular embodiment of the device for treating a synthesis gas from a biomass gasification step that is the subject of the present invention. This device comprises:
  a cooler 205 which comprises:
    an inlet 210 for synthesis gas from the gasification means, not shown;
    an outlet 215 for cooled synthesis gas;
    an outlet 220 for the heavy tars and for the water; and
    an inlet 225 for the cooling liquid;
  means 230, 230' and 230" for adsorbing, directly on output from the cooler 205, the cooled synthesis gas by an adsorption bed, which comprises:
    an inlet 235 for cooled synthesis gas;
    an outlet for purified synthesis gas and for water and light tars; and
  a means 245 for switching between a saturated adsorption means and a regenerated adsorption means, comprising in addition an inlet 255 for desorption liquid;
  a means 245' for separation between light tars and the purified synthesis gas, comprising an outlet 240 for purified synthesis gas and an outlet 260 for water and light tars,
  a separator 297, comprising a means 275 for decanting the water and heavy tars, output from the cooler, from the synthesis gas, which comprises:
    an inlet 280 for water;
    an inlet 285 for scrubbing liquid; and
    an inlet 290 for water and heavy tars;
  a means 295 for cooling the water output from the decantation means 275;

a means 255 and 260 for regenerating at least one adsorption bed by temperature-modulated or pressure-modulated desorption.

The cooler 205 is, for example, a packed column, a plate column, spray column or Venturi column. This cooler 205 can be connected to a heat exchanger or a means for refrigerating the cooler 205. This cooler 205 lowers the temperature of the synthesis gas for a given pressure, for example the atmospheric pressure, so as to reach the dew point temperature of the tars. This cooler 205 comprises an inlet 210 for synthesis gas from the gasification means, which is, for example, a valve for injecting synthesis gas into the cooler 205. On input into the cooler 205, the synthesis gas is, for example, at a temperature of between 100° C. and 250° C. This cooler 205 also comprises an outlet 215 for cooled synthesis gas, which is, for example, a discharge valve for the condensed synthesis gas. On output from the cooler 205, the cooled synthesis gas is at a temperature of between 5° C. and 30° C., and preferably between 5° C. and 10° C. The cooler 205 comprises, in addition, an outlet 220 for heavy tars and water, which is, for example, a discharge valve. These heavy tars and this water are the result of the condensation of the input synthesis gas, and corresponding to impurities to be removed in order to increase the efficiency of the synthesis gas. Lastly, this cooler 205 comprises an inlet 225 for water, which is, for example, a valve for injecting water into the cooler 205, making it possible to reduce the internal temperature of the cooler 205. This water inlet 225 also makes it possible to increase the humidity of the output condensed synthesis gas. In some variants, the outlet 215 for condensed synthesis gas is looped to the synthesis gas inlet 210 so as to increase the efficiency of the cooler 205.

It can be noted that while the liquid used in the cooler 205 is advantageously water, this liquid can be replaced by a thermal oil or by any other scrubbing liquid whose characteristics are compatible with the present application.

The adsorption means 230 is, for example, an adsorption bed passed through by the cooled synthesis gas in order to collect tars and inorganic compounds transported by the synthesis gas. This adsorption bed comprises, for example, activated carbon, zeolites or adsorbent polymers. The temperature of this bed is configured to enable high adsorption of the light tars transported by the synthesis gas on output from the cooler 205. In addition, the temperature of this bed is chosen to provide minimum condensation of the tars transported. Preferably, the adsorbent bed uses activated carbon. The activated carbons have, firstly, great affinity with the organic compounds, eg the tars, and, secondly, a capacity for adsorbing hydrogen sulfide. However, hydrogen sulfide may represent up to 3% by mass of the synthesis gas, under pressure and temperature conditions close to ambient atmospheric conditions. The operating conditions of this adsorption bed are, firstly, a temperature of between 5° C. and 30° C. and preferably between 5° C. and 10° C., and, secondly, a pressure similar to the atmospheric pressure. This adsorption means 230 comprises an inlet 235 for cooled synthesis gas, which is, for example, a valve for injecting synthesis gas into the adsorption means. This adsorption means 230 also comprises an outlet for purified synthesis gas, water and light tars that can be supplied to a methanation means, not shown.

Advantageously, the device that is the subject of the present invention comprises a plurality of adsorption beds placed in series or in parallel. In other variants used preferably, and shown in FIG. 2, the device 10 comprises a plurality of adsorption beds used alternatively. In this way, when an adsorption bed is saturated with impurities, the switching means 245 switches the injection of synthesis gas from a saturated adsorption bed to a regenerated adsorption bed. More generally, this switching means 245 is a switch configured to direct the flow of condensed synthesis gas to at least one unsaturated adsorption bed. When an adsorption bed is saturated, the switching means 245 closes the synthesis gas injection valve 235 to this adsorption bed, and a process of regenerating this adsorption bed is started. In some preferred embodiments, the device 10 comprises three adsorption beds.

The device 20 comprises a separator 297 between the water and the light tars. This separator 297 comprises a settlement tank 275 that comprises an outlet 299 for the water and an outlet (not shown) for the light tars.

The desorption of an adsorption bed 230 is carried out by injecting a desorbing fluid suitable for scrubbing the adhering impurities on the adsorption bed. Preferably, the adsorption bed 230 is desorbed by injecting vapor superheated to a temperature of 110° C. to 250° C., and with a superheated vapor volumetric flow rate 3 to 5 times less than the synthesis gas volumetric flow rate. In this way, the desorption is carried out in a time less than or equal to the saturation time of the adsorption bed.

The device 20 also comprises an additional settlement tank 305 for heavy tars, output from the cooler 205.

PSA ("Pressure Swing Adsorption") and TSA ("Thermal Swing Adsorption") techniques can, for example, be employed to desorb the adsorption bed.

Other gaseous fluids can also be used, such as a pure gas or a gas mixture chosen from $CO_2$, $CH_4$, $H_2$, CO, at a temperature of 110° C. to 250° C. and with a gas volumetric flow rate 3 to 5 times less than a synthesis gas volumetric flow rate.

In a variant, the adsorption bed is placed in a vacuum.

The switching means 245 comprises an inlet 255 for water vapor, which is, for example, a valve for injecting water vapor heated to 140° C. The adsorption beds are equipped with an outlet 260 for light tars and for water vapor, which is, for example, a discharge valve for light tars and for water vapor controlled in step with the switching means 245.

In some variants, after an adsorption bed has undergone desorption, this bed is then cooled by means of a cooling means, for example a heat exchanger, or by injecting an inert gas into the adsorption bed, preferably $CO_2$, which avoids the degradation peaks in the quality of the synthesis gas. In these variants, the device 10 can also comprise a means for switching between a bed that has undergone desorption and a bed that has undergone cooling. This switching means is, for example, a control means configured to control the desorption or cooling of a bed. In other variants, each adsorption bed carries out the cycle of adsorption, desorption, then cooling such that, at any given time, a single bed carries out one of the steps of this cycle.

The decantation means 275 is, for example, a decantation tray allowing tars to be eliminated. This decantation means 275 also comprises an inlet 290 for water and for heavy tars output from the cooler 205, which is, for example, an injection valve. This decantation means 275 also comprises an inlet 285 for scrubbing liquid, is which is, for example, a valve injecting rapeseed methyl ester. Lastly, this decantation means 275 comprises an outlet 280 for water, which is, for example, a valve discharging water from the decantation tray.

The device also comprises a means 295 for cooling water output from the decantation means 275, which is, for example, a heat exchanger configured to lower the temperature of the water from 30° C. to 20° C. and preferably between 5° C. and 10° C. This water is then returned to the water inlet 225 of the cooler 205.

The device and the method given as illustration of the invention are especially suitable for producing syngas from biomass. Nevertheless, this device and this method can be easily adapted to the purification of syngas coming from the gasification of other media, including carbon.

The invention claimed is:

1. A method for treating a synthesis gas from a gasification step, which comprises the steps of:
   cooling the synthesis gas to condense heavy organic impurities and water;
   adsorption, on exiting the cooling step, of light organic impurities and inorganic impurities by at least one adsorption bed;
   separating, by decantation, the water and heavy tars from the synthesis gas; and
   regenerating at least one adsorption bed by a temperature-modulated desorption of injecting a hot fluid in each adsorption bed.

2. The method according to claim 1, wherein the regeneration step comprises the step of injecting a hot gas against said each adsorption bed.

3. The method according to claim 2, wherein the hot gas is a superheated vapor at a temperature of 110° C. to 250° C., and with a superheated vapor volumetric flow rate that is 3 to 5 times less than a synthesis gas volumetric flow rate.

4. The method according to claim 2, wherein the hot gas is a pure gas or a gas mixture chosen from $CO_2$, $CH_4$, $H_2$ and CO, at a temperature of 110° C. to 250° C. and with a gas volumetric flow rate that is 3 to 5 times less than a synthesis gas volumetric flow rate.

5. The method according to claim 2, wherein the step of separation by decantation utilizes a portion of products from the regeneration step.

6. The method according to claim 1, wherein the synthesis gas is cooled to between 5° C. and 30° C. during the cooling step.

7. The method according to claim 6, wherein the synthesis gas is cooled to between 5° C. and 10° C.

8. The method according to claim 1, further comprising the step of cooling the decantation water, from the separation step, to between 5° C. and 30° C.; and wherein the step of cooling utilizes the cooled decantation water to cool the synthesis gas.

9. The method according to claim 8, wherein the decantation water from the separation step is cooled to between 5° C. and 10° C. during the cooling step.

10. The method according to claim 1, wherein the regeneration step is carried out at the same time, at least partially, as the adsorption step.

11. The method according to claim 1, wherein the regeneration step comprises the step of cooling an adsorption bed, which is carried out at the same time, at least partially, as the adsorption step, and at the same time, at least partially, as the step of desorbing an adsorption bed.

12. The method according to claim 1, further comprising the step of switching between a first adsorption bed carrying out the adsorption step and at least one second adsorption bed carrying out a regeneration step.

13. The method according to claim 1, wherein the regeneration of an adsorption bed is carried out by injecting an inert gas into the adsorption bed.

14. A device to treat a synthesis gas from a gasification process, comprising:
   a cooler to cool the synthesis gas to condense heavy organic impurities and water;
   at least one adsorpter, on output from the cooler, to adsorp light organic impurities and inorganic impurities, said at least one adsorpter comprising at least one adsorption bed connected to the output of the cooler;
   a separator comprising a decanter to decant the water and heavy tars, output from the cooler, from the synthesis gas; and
   a regenerator to regenerate at least one adsorption bed by a temperature-modulated desorption comprising an injector to inject a hot fluid in each adsorption bed.

15. The device according to claim 14, further comprising at least two adsorption beds and a switch to switch between the two adsorption beds, the switch configured to circulate the synthesis gas in at least one adsorption bed when other adsorption bed is in a desorption phase.

16. The device according to claim 14, wherein the cooler utilizes a scrubbing liquid to scrub the synthesis gas.

17. The device according to claim 16, wherein the scrubbing liquid is water or oil.

* * * * *